(12) United States Patent
Corghi

(10) Patent No.: US 7,610,808 B2
(45) Date of Patent: Nov. 3, 2009

(54) METHOD FOR BALANCING MOTOR VEHICLE WHEELS

(75) Inventor: Remo Corghi, Correggio (IT)

(73) Assignee: Corghi S.p.A., Correggio (Reggio Emilia) (IT)

( * ) Notice: Subject to any disclaimer, the term of this patent is extended or adjusted under 35 U.S.C. 154(b) by 136 days.

(21) Appl. No.: 11/849,635

(22) Filed: Sep. 4, 2007

(65) Prior Publication Data

US 2008/0060435 A1 Mar. 13, 2008

(30) Foreign Application Priority Data

Sep. 11, 2006 (IT) .......................... RE2006A0103

(51) Int. Cl.
  *G01M 1/16* (2006.01)
  *G01M 1/22* (2006.01)
(52) U.S. Cl. .............................. 73/460; 73/462; 73/468
(58) Field of Classification Search ................... 73/468, 73/460, 458, 462
See application file for complete search history.

(56) References Cited

U.S. PATENT DOCUMENTS

| 5,406,846 | A | * | 4/1995 | Gasch et al. | ................... | 73/462 |
| 5,969,247 | A | * | 10/1999 | Carter et al. | ................... | 73/462 |
| 6,952,964 | B2 | | 10/2005 | Gerdes et al. | | |

* cited by examiner

*Primary Examiner*—Helen C. Kwok
(74) *Attorney, Agent, or Firm*—Browdy and Neimark, P.L.L.C.

(57) ABSTRACT

A method for balancing motor vehicle wheels, comprising mounting the wheel onto the rotating spindle of a balancing machine, using a probe of known type, selecting balancing planes and diameters, providing the data to the balancing machine, spinning the wheel, calculating the value of imbalance, calculating an entity and angular position for balancing weights to be applied in the balancing planes and diameters previously selected by the operator; during the spinning of the wheel, measuring an acceleration time between two predetermined speeds of the wheel; calculating an imbalance threshold value and applying the balancing weight only if it is above the calculated threshold value.

9 Claims, No Drawings

METHOD FOR BALANCING MOTOR VEHICLE WHEELS

The invention relates to the field of balancing vehicle wheels comprising a rim and a tyre.

Each rotating organ, such as a rim and a tyre, as is known, when made to rotate at high speed, as happens with vehicle wheels when running on a road, exhibits imbalances of two types: static and dynamic.

Static imbalance is responsible for forces contained in the centre of gravity plane, perpendicular to the wheel axis, which forces cause tendential oscillations in the wheel in that plane.

Dynamic imbalance is responsible for oscillations or vibrations of the wheel about a diametral axis thereof.

The overall imbalance of the wheel, which is corrected by balancing machines, is the resultant of both the above types of imbalance.

Imbalance is corrected by applying two weights, the entity and position of which on the rim is calculated by known balancing machines.

The two weights are applied in two different planes, both perpendicular to the wheel axis, and provide both a resultant directed radially and a moment in a plane comprising the wheel axis.

To correct static imbalance it may be sufficient to apply one weight only, while to correct dynamic imbalance, in theory two weights must be applied, distanced from one another in the direction of the wheel axis. In reality and in practice one weight is sufficient to eliminate static imbalance and one weight for dynamic imbalance, the effect of which is added to the effect the static-balancing weight exerts on the dynamic balance.

The two corrective weights calculated by the balancing machine, which also indicates the positions at which they are to be applied, therefore have a synergic effect in the sense that both of them, not being applied in the plane of the centre of gravity of the wheel, have an influence on both the static imbalance and the dynamic imbalance.

In modern balancing machines the operator selects the wheel plane and diameter position at which each of the two weights needed for the balancing operation will be placed at, and the machine performs its calculations of the weights to be applied and their angular position in order to obtain a datum giving an overall imbalance resulting from the sum of the static imbalance and the dynamic imbalance, which overall imbalance is in theory close to zero.

In actual fact, as it is practically impossible to reach a perfect state of equilibrium, the machine performs its calculations to determine two weights which, when applied in the suggested positions, reduce the overall imbalance to below a threshold value.

The threshold value corresponds to an overall imbalance of the wheel such that when the vehicle is in motion there are no disturbances resulting from imbalance which might be noticed by the user and which might lead to excessive wear on the mechanical parts and the tyres themselves.

Due to the synergic effect which balancing weights have on both types of imbalance, static and dynamic, in order to reduce the overall imbalance to below a threshold value larger weights are generally required than those which would be necessary only to correct the static imbalance, or only the dynamic imbalance.

Much research and testing has been performed with the aim of reducing the entity of the weights required for bringing the dynamic or overall imbalance of the wheel below the threshold value.

It has been established that the threshold value which is tolerable for static imbalance alone is lower than the threshold value which is tolerable for dynamic imbalance alone, and that therefore the overall threshold value is greater if the overall imbalance is prevalently due to the dynamic imbalance. This has raised the problem of calculating the right threshold value for each of the two imbalances, static and dynamic, or at least which is the tolerable threshold value for the overall imbalance.

This leads to establishing an overall threshold value which is not close to zero, as is the practice at present in most cases, but which is higher, and is indicative of an imbalance which is mostly due to the component relating to dynamic imbalance.

As the imbalance is strictly connected to the wheel's geometric characteristics, a correlation between the geometric characteristics of the wheel and the tolerable imbalance threshold value has been sought.

U.S. Pat. No. 6,952,964 teaches a process for balancing a wheel in which the threshold value for the static imbalance (represented by a force), and for the dynamic imbalance (represented by a moment) are calculated according to the application diameter of the weights and the distance between the balancing planes selected by the operator.

After having set the wheel spinning and having read off the imbalance values, this enables a control on whether the residual dynamic imbalance, after the correcting of the static imbalance, remains at levels which are outside the threshold value.

The correction of the dynamic imbalance requires the application of two equal weights in diametrically opposite positions, each in one of the two balancing planes, and therefore in the plane destined to receive the static balancing weight; the weight is never staggered by more than 90° from the application position of the dynamic balancing weight in the same plane.

From this it can be understood that the dynamic imbalance can be reduced after the static balancing has been completed, and it might even fall below the threshold value for the dynamic imbalance.

In particular, the prior art teaches us that the threshold value for both the static imbalance and the dynamic imbalance are inversely proportional to the diameter of application of the weights.

The relationship identified in the prior art, though constituting progress in the balancing of rotating bodies in general, is not entirely satisfactory in the field of vehicle wheels, in which the application diameter of the weights is conditioned by the shape of the rim and it is not always possible to correlate this to the overall geometric characteristics of the wheel.

The aim of the present invention is to provide a method which enables, by use of a single parameter, to determine the threshold values for the static imbalance, the dynamic imbalance and the overall imbalance of a motor vehicle wheel.

This aim is attained by the invention by means of a correlation between the overall moment of inertia of the wheel and the threshold values.

As an indicative parameter of the moment of inertia of the wheel, the invention teaches adopting the time of acceleration of the wheel between two preselected rotation speeds.

It has been found to be advantageous to select the time for acceleration between 25 and 50 rpm, given that the torque of the electric motors used in balancing machines is practically constant during this interval.

It has been found that the function linking the threshold values of the various types of static, dynamic and overall imbalance to the acceleration time is practically linear, and is expressed by the following equation:

$$W_B = K_S \times T_{ACC} + S_0$$

Where
$W_B$ is the threshold level of the balancing weight expressed in grams (g)
$K_S$ is a threshold constant expressed in grams per millisecond (g/ms)
$S_0$ is the minimum threshold value expressed in grams (g)
$T_{ACC}$ is the acceleration time expressed in milliseconds (ms).

The same equation is suitable for calculating the threshold values of the balancing weights for the overall imbalance $W_{BD}$; the static imbalance $W_{BS}$ and the dynamic imbalance $W_{BM}$.

The values of the constants $K_S$ and $S_0$ are determined by testing, for each type of imbalance.

By way of example, for a light alloy wheel of size 8"×16", experimental tests led to the determination of the following threshold constants:
* overall imbalance constants:
$K_{SD}$=6.25 g/s
$S_{OD}$=1.5 g
* static imbalance constants
$K_{SS}$=16.25 g/s
$S_{OS}$=1.5 g
* dynamic imbalance constants
$K_{SC}$=15 g/s
$S_{OC}$=1.5 g With a wheel acceleration time going from 25 to 50 rpm of $T_{ACC}$=0.4 s.

By applying the equation of the present invention, the following threshold values were calculated $$* W_{BDi} = W_{BDe} = 6.25 \times 0.4 + 1.5 = 4 \text{ g}$$

$$* W_{BS} = 16.25 \times 0.4 + 1.5 = 8 \text{ g}$$

$$* W_{BMi} = W_{BMe} = 15 \times 0.4 + 1.5 = 7.5 \text{ g}$$

The following symbols will be used in the following description.
$W_{BD}$ is the threshold value of the correcting weights for overall imbalance;
$W_{BS}$ is the threshold values of the correcting weights for static imbalance;
$W_{BM}$ is the threshold value of the correcting weights of the dynamic imbalance;
$W_S$ is the static imbalance;
$W_M$ is the dynamic imbalance;
$W_D$ is the overall imbalance;
$W_{Di}$ and $W_{De}$ are the overall imbalances calculated in the two balancing planes
$W_{S1} = W_S - W_{BS}$ (vectorial subtraction);
$W_{M1i} = W_{M1e} = W_M - W_{BM}$ are vectorial subtractions in the balancing planes of the internal and external wheel.

The functioning procedures of a balancing machine operating according to the invention are as follows:

A. The machine takes account of the threshold value $W_{BD}$ of the overall imbalance, calculated as specified above.
The following might emerge:
A1. The overall imbalance $W_D$ measured by the balancing machine is smaller than or equal to $W_{BD}$ ($W_D \leq W_{BD}$);
The machine tells the operator not to apply any weight.
A2. The overall imbalance $W_D$ measured by the balancing machine is greater than $W_{BD}$ ($W_D > W_{BD}$); the machine subtracts $W_{BD}$ from $W_D$ and for each balancing plane calculates the values of $W_{D1i}$ and $W_{D1e}$, where $W_{D1i} = W_{Di} - W_{BD}$, and $W_{D1e} = W_{De} - W_{BD}$.

B. The machine takes account of the threshold values $W_{BS}$ and $W_{BM}$ of the static and dynamic imbalances, calculated as specified above.
B1. The static imbalance WS measured by the machine is greater than $W_{BS}$ ($W_S > W_{BS}$); and the dynamic imbalance $W_M$ measured by the machine is greater than $W_{BM}$ ($W_M > W_{BM}$);
the machine calculates $W_{S1}$; $W_{M1i}$ and $W_{M1e}$ and calculates the resultants $W_{Di}$ and $W_{De}$ in the two balancing planes, displaying them on the machine's screen.
B2. The static imbalance $W_S$ measured by the machine is greater than $W_{BS}$ ($W_S > W_{BS}$); and the dynamic imbalance $W_M$ measured by the machine is less than or equal to $W_{BM}$ ($W_M \leq W_{BM}$);
the machine calculates $W_{S1}$ and indicates which balancing plane the weight has to be applied in to minimise $W_M$, displaying the result on the machine's screen.
B3. The static imbalance $W_S$ measured by the machine is less than or equal to $W_{BS}$ ($W_S \leq W_{BS}$); and the dynamic imbalance $W_M$ measured by the machine is greater than $W_{BM}$ ($W_M > W_{BM}$);
the machine calculates $W_{M1i}$ and $W_{M1e}$ and displays the results on the screen.
B4. The static imbalance WS measured by the machine is less than or equal to $W_{BS}$ ($W_S \leq W_{BS}$); and the dynamic imbalance $W_M$ measured by the machine is less than or equal to $W_{BM}$ ($W_M \leq W_{BM}$);
the machine tells the operator not to apply any weight.

The invention claimed is:

1. A method for balancing motor vehicle wheels, comprising following operations:
   mounting a wheel onto a rotating spindle of a balancing machine;
   using a probe of known type for selecting balancing planes and diameters, and providing data relating to the planes and diameters to the balancing machine;
   spinning the wheel;
   calculating a value of imbalance W;
   calculating an entity and angular position for balancing weights to be applied in the balancing planes and diameters previously selected by an operator;
   characterised in that said method comprises following further activities;
   a. during the spinning of the wheel, measuring an acceleration time $T_{ACC}$ between two predetermined speeds of the wheel;
   b. calculating an imbalance threshold value $W_B$ with the equation as follows:

$$W_B = K_S \times T_{ACC} + S_0$$

where
   $K_S$ is a threshold constant expressed in grams per millisecond (g/ms)
   $S_0$ is a minimum threshold value expressed in grams (g)
   $T_{ACC}$ is an acceleration time expressed in milliseconds (ms)
   c. applying a balancing weight only if said imbalance value is above the calculated threshold value.

2. The method of claim 1, characterised in that the values of $K_S$ and $S_0$ are determined experimentally.

3. The method of claim 1, characterised in that calculations are made of at least one of the following threshold values: $W_{BS}$ of the balancing weight of static imbalance, $W_{BM}$ of the balancing weight of the dynamic imbalance and $W_{BD}$ of the balancing weight of the overall imbalance.

4. The method of claim 3, characterised in that the machine calculates the threshold value $W_{BD}$ of the balancing weight for the overall imbalance, and if the overall imbalance $W_D$ measured by the machine is less than or equal to $W_{BD}$ ($W_D <= W_{BD}$), no weight is applied.

5. The method of claim 3, characterised in that the machine calculates the threshold value $W_{BD}$ of the balancing weight of the overall imbalance, and when the overall imbalance $W_D$ measured by the machine is greater than $W_{BD}$ ($W_{D>WBD}$), the machine subtracts $W_{BD}$ from $W_D$ for each balancing plane and calculates the values of $W_{D1i} = W_{Di} - W_{BD}$, and $W_{D1e} = W_{De} - W_{BD}$ and displays said values $W_{D1i}$ and $W_{D1e}$ on a screen of the machine.

6. The method of claim 3, characterised in that the machine calculates the threshold values $W_{BS}$ and $W_{BM}$ of the balancing weight for the static and dynamic imbalances, and when the static imbalance $W_S$ measured by the machine is greater than $W_{BS}$ ($W_S > W_{BS}$); and the dynamic imbalance $W_M$ measured by the machine is greater than $W_{BM}$ ($W_M > W_{BM}$), the machine calculates $W_{S1}$, $W_{M1i}$ and $W_{M1e}$ and calculates the resultants $W_{Di}$ and $W_{De}$ that are the overall imbalances calculated in the two balancing planes, and displays said resultants $W_{Di}$ and $W_{De}$ on a machine's screen.

7. The method of claim 3, characterised in that the machine calculates the threshold values $W_{BS}$ and $W_{BM}$ of the balancing weight of the static and dynamic imbalances, and when the static imbalance $W_S$ measured by the machine is greater than $W_{BS}$ ($W_S > W_{BS}$) and the dynamic imbalance $W_M$ measured by the machine is less than or equal to $W_{BM}$ ($W_M <= W_{BM}$), the machine calculates $W_{S1}$ whereby $W_{S1}$ is the vectorial subtraction $W_S - W_{BS}$, and indicates the plane in which the weight must be applied in order to minimise $W_M$, and displays the result on a machine's screen.

8. The method of claim 3, characterised in that the machine calculates the threshold values $W_{BS}$ and $W_{BM}$ of the balancing weight for the static and dynamic imbalances, and when the static imbalance $W_S$ measured by the machine is less than or equal to $W_{BS}$ ($W_S <= W_{BS}$); and the dynamic imbalance $W_M$ measured by the machine is greater than $W_{BM}$ ($W_M > W_{BM}$), the machine calculates $W_{M1i}$ and $W_{M1e}$ whereby $W_{M1i}$ and $W_{M1e}$ are vectorial subtractions in the balancing planes of the internal and external wheel and displays the results on the screen.

9. The method of claim 3, characterised in that the machine calculates the threshold values $W_{BS}$ and $W_{BM}$ of the balancing weight of the static and dynamic imbalances, and when the static imbalance $W_S$ measured by the machine is less than or equal to $W_{BS}$ ($W_S <= W_{BS}$) and the dynamic imbalance $W_M$ measured by the machine is less than or equal to $W_{BM}$ ($W_M <= W_{BM}$), the machine tells the operator not to apply any weight.

* * * * *